Sept. 23, 1958 S. R. NORDSTROM ET AL 2,853,686

ELECTRIC EQUALIZING NETWORKS

Filed Oct. 20, 1955

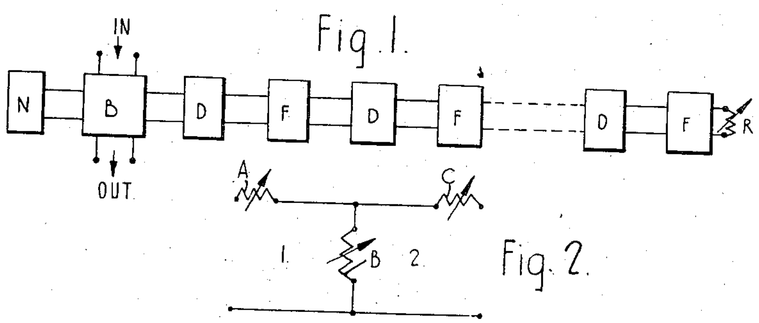
Fig. 1. Fig. 2.

Fig. 3.

$$C + \frac{(Z + A)B}{Z + A + B} = Z \qquad (1)$$

$$A + \frac{(Z + C)B}{Z + C + B} = Z(1 + d) \qquad (2)$$

$$\frac{B}{A + B + Z} = e^{-a} = 1 - b \qquad (3)$$

$$\frac{A}{Z} = \frac{d(1 + b^2) + 2b^2}{2b(2-b) - d(1-b)^2} \qquad (4)$$

$$\frac{B}{Z} = \frac{1-b}{b} \cdot \frac{2b(2+d)}{2b(2-b) - d(1-b)^2} \qquad (5)$$

$$\frac{C}{Z} = \frac{2b^2 - d(1-b^2)}{2b(2-b) - d(1-b)^2} \qquad (6)$$

$$a = \left[\log_e 2\cdot5/0\cdot01\right]/32 \qquad (7)$$

$$\frac{A}{Z} = \frac{0\cdot05 + d}{0\cdot57 - 0\cdot69d} \qquad (8)$$

$$\frac{B}{Z} = \frac{2 + d}{0\cdot35 - 0\cdot42d} \qquad (9)$$

$$\frac{C}{Z} = \frac{0\cdot05 - d}{0\cdot60 - 0\cdot74d} \qquad (10)$$

*Inventor*

K.S.T. JANSON - S.R.NORDSTROM

*By* R. P. Morris

*Attorney*

United States Patent Office 2,853,686

Patented Sept. 23, 1958

2,853,686

ELECTRIC EQUALIZING NETWORKS

Sven Robert Nordstrom and Knut Stig Torbjorn Janson, Stockholm, Sweden, assignors to International Standard Electric Corporation, New York, N. Y.

Application October 20, 1955, Serial No. 541,725

Claims priority, application Sweden October 21, 1954

4 Claims. (Cl. 333—28)

The present invention relates to equalization networks of the kind known as "cosine equalizers." Such equalization networks of constructions hitherto known comprise a plurality of cascade connected equalizing stages, the attenuation of which varies as the cosine of the frequency within a given range of frequency for a fundamental tone and its harmonics. The amplitude of these cosine curves can be adjusted, whereby any function of attenuation can be approximately produced within the given range of frequency.

In these known equalizers there are included a plurality of cascade connected equalizing stages which contain a successively increasing number of phase shifting networks. Thus, the total number of phase shifting networks will be very large. As an example, it may be mentioned that a cosine equalizer with 15 cosine terms of known construction contains a total of 210 identical phase shifting networks.

The principal object of the present invention is to reduce the number of phase-shifting networks necessary for a cosine equalizer having a given performance.

This object is achieved according to the invention by providing an electric equalizing network of the cosine type, comprising a plurality of phase-shifting networks and a plurality of attenuating networks connected alternately in cascade, each attenuating network being so designed that it forms a reflecting junction at one end, and a non-reflecting junction at the other end.

In the case of the example given above, the application of the invention may permit the number of phase-shifting networks to be reduced to 14, for example, at the expense of an increase in the number of variable resistances required, from 30 to not more than 45.

The invention will be described with reference to the accompanying drawings, in which:

Fig. 1 shows a block schematic circuit diagram of a cosine equalizer according to the invention;

Fig. 2 shows a circuit of the attenuator used in Fig. 1; and

Fig. 3 shows a list of equations used in explaining the invention.

The cosine equalizer according to the invention shown in Fig. 1 comprises a conventional differential transformer or hybrid coil arrangement B, one pair of conjugate circuits of which respectively comprise the input and output circuits of the equalizer. The other pair of conjugate circuits are connected respectively to a series of phase-shifting networks F and attenuators D (which may be variable) connected alternately in cascade, and to a balancing network N. The series of elements F and D are terminated by a resistance R which may also be variable.

In Fig. 2 is shown one of the adjustable attenuators with input and output circuits designated by 1 and 2 respectively, and consisting of a T-network comprising series resistances A and C, and a shunt resistance B.

The attenuators D and the terminal resistance R, together with the phase shifting networks F, correspond to the different equalizing stages of a conventional cosine equalizer and can be designed or adjusted so that a certain desired relation is obtained between the impedances at each junction between two networks F and D. Thus, the cascade series of networks, which according to Fig. 1 is formed of the phase shifting networks F and the attenuators D, can be so adjusted that it will produce a plurality of different phases of reflected waves. If the phase shifting networks F are made identical with those phase shifting networks which form part of the cascade-connected equalizing stages of a conventional cosine equalizer the reflections arising will in principle correspond to the reflections which arise in the cascade connected equalizing stages, when these are adjusted correspondingly. The network effectively present between the In and Out circuits of Fig. 1, therefore acts fundamentally in the same way as a cosine equalizer with the corresponding number of equalizing stages included, but it is to be observed that the following conditions must be fulfilled for the networks F and D:

(1) It shall be possible to adjust desired reflections of the forward waves independently of each other.

(2) No reflections of the return waves must occur.

Both these conditions can be fulfilled by choosing or adjusting the values of the resistances A, B and C in the attenuators D shown in Fig. 2, in such a manner that the following three conditions are fulfilled, which correspond to those mentioned above.

(1) If the input circuit 1 is connected to an impedance Z corresponding to the image impedance of the phase shifting networks, the impedance of the attenuator measured at the output circuit 2 shall equal Z, no matter how the network is adjusted.

(2) If the output circuit 2 is connected to an impedance Z, the impedance of the attenuator measured at the input circuit 1 shall have the desired value, so that the desired reflection is obtained.

(3) The operative attenuation of the attenuator between the impedance Z shall be constant and independent of the adjustment of the attenuator.

These conditions can be fulfilled in the attenuator shown in Fig. 2 if the values of the resistances A, B, and C have a predetermined relation.

The attenuation introduced by the attenuators is not disadvantageous, if it is not too great, as reflected waves coming from attenuators at the end of the cascade series as a rule should be of smaller amplitude than those coming from the attenuators at the beginning of the series.

The balancing network N shown in Fig. 1 should ideally have an impedance exactly the same as that of the cascade series of networks D and F, and this can be achieved by providing an identical duplicate series with the attenuators adjusted in the same way. This would have the advantage that the input and output impedances of the complete equalizer network at circuits In and Out (Fig. 1) would be unaffected by the adjustment of the attenuators. This would however be a complicated arrangement, and as an alternative, the network N may be a simpler structure with an impedance approximately equal to Z.

Information on the design of the phase-shift networks for a cosine equalizer may be obtained from the article entitled "The L3 Coaxial System: Equalization and Regulation" by R. W. Ketchledge and T. R. Finch in the Bell System Technical Journal, July 1953, commencing at page 852.

The three conditions for the attenuator network, Fig. 2, set out above are expressed respectively by the three Equations 1, 2 and 3 of Fig. 3. In Equation 2, $d$ is a quantity which may be positive or negative, which represents the degree of reflection required at the input to the attenuator. In Equation 3, $a$ is the attenuation which it is desired that the attenuator shall introduce, and $b$ is a function of $a$ more convenient for the calculations.

Equations 4, 5 and 6 give the values of A, B and C, obtained by solving Equations 1, 2 and 3, in terms of $b$, $d$ and Z.

To give an example of the choice of the quantity $b$ in a practical case, Fig. 9 on page 855 of the above-quoted article may be referred to. It can be seen from the curve that for the harmonics above 5, a straight line joining the point 0, 2.5 db (obtained by extending the scale of ordinates upwards) to the point 16, 0.01 db would indicate a suitable range of relative harmonic magnitudes. From this it can be concluded that if the first 16 harmonics are used, requiring 16 attenuators, the attenuation $a$ required for each attenuator will be as given in Equation 7, Fig. 3, remembering that each attenuator is traversed once in each direction by the waves. The value of $a$ so obtained is about 1.5 db. The corresponding value of $b$ is 0.158, and the resulting values of A, B and C are given in Equations 8, 9 and 10, respectively, of Fig. 3. From these equations it can be seen that $d$ can have any positive or negative value not greater than 0.05 which is sufficient.

It will be understood that the particular values given above refer only to one example of the equalizer according to the invention. In other circumstances, different values would generally be required.

It may be mentioned that the balancing network N provides an additional variable for the adjustment of the magnitude of the fundamental harmonics term of the equalizer. If the impedance of the network N departs from Z some of the wave applied to the input circuit of the differential transformer arrangement B will be directly transmitted to the output circuit, and the proportion may evidently be adjusted by suitable choice of the impedance of the balancing network N.

What we claim is:

1. An electric equalizing network of the cosine type, comprising a plurality of phase-shifting networks and a plurality of attenuating networks connected alternately in cascade, each attenuating network comprising means for producing a plurality of different phases of reflected waves at output end and a non-reflecting termination at the input end.

2. An electric equalizing network of the cosine type, comprising a differential transformer arrangement, of which one pair of conjugate circuits form respectively the input and output circuits of the said equalizing network, the other pair of conjugate circuits being connected respectively to a balancing network and to a plurality of phase-shifting networks and attenuating networks connected alternately in cascade, each attenuating network being so designed that the impedance of the phase-shifting network connected to the output end thereof produces a predetermined reflecting termination, while the impedance connected to the input end of the attenuating network forms a non-reflecting termination.

3. A network according to claim 2 in which the last equalizing network is terminated by a resistance.

4. A network according to claim 2 in which the attenuating networks are adjustable.

References Cited in the file of this patent

UNITED STATES PATENTS 2,348,572 Richardson ------------- May 9, 1944